(12) United States Patent
Guan et al.

(10) Patent No.: US 12,302,141 B2
(45) Date of Patent: May 13, 2025

(54) REFERENCE SIGNAL MEASUREMENT METHOD, RESOURCE INDICATION METHOD, AND APPARATUS

(71) Applicant: HUAWEI TECHNOLOGIES CO., LTD., Guangdong (CN)

(72) Inventors: Peng Guan, Shenzhen (CN); Xi Zhang, Chengdu (CN); Bo Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 428 days.

(21) Appl. No.: 17/725,085

(22) Filed: Apr. 20, 2022

(65) Prior Publication Data
US 2022/0256379 A1    Aug. 11, 2022

Related U.S. Application Data

(63) Continuation of application No. PCT/CN2019/116825, filed on Nov. 8, 2019.

(51) Int. Cl.
| | | |
|---|---|---|
| H04W 24/08 | (2009.01) | |
| H04B 7/06 | (2006.01) | |
| H04L 5/00 | (2006.01) | |
| H04W 24/10 | (2009.01) | |

(52) U.S. Cl.
CPC .......... *H04W 24/08* (2013.01); *H04B 7/0626* (2013.01); *H04L 5/0048* (2013.01); *H04W 24/10* (2013.01)

(58) Field of Classification Search
CPC ... H04L 5/001; H04B 7/0691; H04W 72/1289
See application file for complete search history.

(56) References Cited

U.S. PATENT DOCUMENTS

| | | | |
|---|---|---|---|
| 2019/0349915 A1* | 11/2019 | Ahn | H04L 5/0048 |
| 2019/0349951 A1* | 11/2019 | Ahmad | H04W 76/14 |
| 2020/0029315 A1* | 1/2020 | Lin | H04B 7/0413 |

(Continued)

FOREIGN PATENT DOCUMENTS

| | | |
|---|---|---|
| CN | 109995409 A | 7/2019 |
| WO | 2019193239 A1 | 10/2019 |

OTHER PUBLICATIONS

3GPP TSG RAN WG1 Meeting #94, Qualcomm Inc, "Maintenance for CSI Measurement" R1-1809422 Aug. 20-24, 2018 Gothenburg, Sweden (Year: 2018).*

(Continued)

*Primary Examiner* — Derrick W Ferris
*Assistant Examiner* — Won Jun Choi
(74) *Attorney, Agent, or Firm* — Fish & Richardson P.C.

(57) ABSTRACT

Example reference signal measurement methods, example resource indication methods, and example apparatuses are provided. One example method includes receiving at least one reference signal from a network device. Channel state information can then be determined based on some or all of the at least one reference signal. The channel state information can then be reported to the network device based on first duration. When it is determined to activate a first antenna panel and measure the at least one reference signal by using the first antenna panel, the first duration can be determined based on a first constraint relationship. The first antenna panel can be currently not activated.

20 Claims, 4 Drawing Sheets

(56) References Cited

U.S. PATENT DOCUMENTS

| | | | |
|---|---|---|---|
| 2020/0186302 A1* | 6/2020 | Manolakos | H04L 5/0064 |
| 2020/0221429 A1* | 7/2020 | Li | H04W 72/23 |
| 2022/0007406 A1* | 1/2022 | Matsumura | H04L 5/0051 |

OTHER PUBLICATIONS

3GPP TSG RAN WG1 Meeting #94, Qualcomm Inc, "Maintenance for CSI Measurement", Aug. 24, 2018, R1-1809422. (Year: 2018).*

Qualcomm Incorporated, "Maintenance for CSI Measurement," 3GPP TSG RAN WG1 Meeting #94 R1-1809422, Gothenburg, Sweden, Aug. 20-24, 2018, 10 pages.

Vivo, "Rel-15 UE features for eMBB and URLLC," 3GPP TSG RAN WG1 Meeting #94, R1-1808229, Gothenburg, Sweden, Aug. 20-24, 2018, 17 pages.

3GPP TS 38.211 V15.7.0 (Sep. 2019), "3rd Generation Partnership Project; Technical Specification Group Radio Access Network; NR; Physical channels and modulation (Release 15)," Sep. 2019, 97 pages.

3GPP TS 38.212 V15.7.0 (Sep. 2019), "3rd Generation Partnership Project; Technical Specification Group Radio Access Network;NR;Multiplexing and channel coding(Release 15)," Sep. 2019, 101 pages.

3GPP TS 38.213 V15.7.0 (Sep. 2019), "3rd Generation Partnership Project; Technical Specification Group Radio Access Network; NR; Physical layer procedures for control (Release 15)," Sep. 2019, 108 pages.

3GPP TS 38.214 V15.7.0 (Sep. 2019), "3rd Generation Partnership Project; Technical Specification Group Radio Access Network; NR; Physical layer procedures for data (Release 15)," Sep. 2019, 106 pages.

3GPP TS 38.321 V15.7.0 (Sep. 2019), "3rd Generation Partnership Project; Technical Specification Group Radio Access Network; NR; Medium Access Control (MAC) protocol specification (Release 15)," Sep. 2019, 78 pages.

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

3GPP TS 38.133 V15.7.0 (Sep. 2019), "3rd Generation Partnership Project; Technical Specification Group Radio Access Network; NR; Requirements for support of radio resource management (Release 15)," Sep. 2019, 1043 pages.

3GPP TS 38.306 V15.7.0 (Sep. 2019), "3rd Generation Partnership Project; Technical Specification Group Radio Access Network; NR; User Equipment (UE) radio access capabilities (Release 15)," Sep. 2019, 55 pages.

PCT International Search Report and Written Opinion issued in International Application No. PCT/CN2019/116825 on Jul. 24, 2020, 13 pages (with English translation).

3GPP TR 38.822 V15.0.1 (Jul. 2019), "3rd Generation Partnership Project; Technical Specification Group Radio Access Network; NR; User Equipment (UE) Feature List (Release 15)," Jul. 2019, 64 pages.

Anonymous, "Rel-15 NR UE Feature List," 3GPP Draft, R1-1809147, Aug. 11, 2018, 34 pages.

Apple, "Discussion on UE Feature List," 3GPP TSG RAN WG1 Meeting #94, R1-1808610, Gothenburg, Sweden, Aug. 20-24, 2018, 7 pages.

Extended European Search Report issued in European Application No. 19951568.5 on Sep. 23, 2022, 11 pages.

Qualcomm Incorporated, "NR UE Features," 3GPP TSG RAN Meeting 81, RP-181707, Gold Coast, Australia, Sep. 10-13, 2018, 8 pages.

* cited by examiner

REFERENCE SIGNAL MEASUREMENT METHOD, RESOURCE INDICATION METHOD, AND APPARATUS

CROSS-REFERENCE TO RELATED APPLICATIONS

This application is a continuation of International Application No. PCT/CN2019/116825, filed on Nov. 8, 2019, the disclosure of which is hereby incorporated by reference in its entirety.

TECHNICAL FIELD

This application relates to the field of wireless communication technologies, and in particular, to a reference signal measurement method, a resource indication method, and an apparatus.

BACKGROUND

To overcome a problem that a path loss of a high-frequency millimeter wave is large, a directional beam with a high gain may be formed between a network device and a terminal device by using an array technology for communication, to increase an antenna gain and compensate for a path loss. Before the directional beam is used for communication, beam training needs to be performed between the network device and the terminal device. A purpose of beam training is to find one or more suitable transceiving beam pairs in a plurality of possible transceiving beam combinations.

In a beam training process, the network device needs to make a beam training-related configuration based on a capability reported by the terminal device. For example, the following parameters are specified in the 3rd generation partnership project (3GPP) Release 15 (R15):

Z indicates a time interval between a moment at which a network device sends a physical downlink control channel (PDCCH) that triggers a channel state information reference signal (CSI-RS) and a moment at which a terminal device reports CSI. For example, if the PDCCH triggers CSI reporting at a moment n, the terminal device should be ready to report the CSI before a moment n+Z, including measuring corresponding CSI, calculating a reporting quantity required by the network device, encoding the CSI into a reporting format that meets a protocol requirement, and the like.

Z' indicates a time interval between a moment at which the network device sends the CSI-RS and a moment at which the terminal device reports the CSI. For example, the network device sends the CSI-RS at a moment m, and the terminal device should be ready to report the CSI before a moment m+Z'.

In an existing standard, it is specified that Z and Z' may meet Table 1.

In Table 1, X1 to X4 each indicate beam reporting timing reported by the terminal device, and KB1 and KB2 each indicate beam switching timing reported by the terminal device.

As required by a current protocol. Table 1 only applies to a case in which the terminal device resides only on a currently activated receive antenna panel to measure the CSI-RS. If the terminal device activates a new receive antenna panel to measure the CSI-RS, time may not be sufficient. For example, a subcarrier spacing of 120 KHz is used as an example. When Z=min(97, X4+KB2)=97, Z−Z'=97−X4 may be calculated. Time for the terminal device to activate a new antenna panel is relatively long, and is generally 2 to 3 milliseconds. Therefore, a difference between Z and Z' is too small, and the terminal does not have enough time to activate a new receive antenna panel to measure the CSI-RS.

In conclusion, in a conventional technology, how the terminal device activates a new antenna panel to measure a CSI-RS is an urgent problem to be resolved.

SUMMARY

An objective of implementations of this application is to provide a reference signal measurement method, a resource indication method, and an apparatus, to resolve a problem that a terminal device does not have enough time to activate a new antenna panel to measure a reference signal.

According to a first aspect, this application provides a reference signal measurement method, including: receiving at least one reference signal from a network device, and determining channel state information based on some or all of the at least one reference signal; and reporting the channel state information to the network device based on first duration. When it is determined to activate a first antenna panel and measure the at least one reference signal by using the first antenna panel, the first duration is determined based on a first constraint relationship. The first antenna panel is any antenna panel that is currently not activated. The first duration is a time interval between a moment at which the network device sends a PDCCH and a moment at which a terminal device reports the channel state information, where the PDCCH is used to schedule the at least one reference signal. The first constraint relationship meets the following form: Z=min(A+T, X+KB) or Z=X+KB, where Z indicates the first duration, min( ) indicates a minimization operation, A is first preset duration, T is duration required for activating one antenna panel, X indicates beam reporting timing reported by the terminal device, and KB indicates beam switching timing reported by the terminal device.

In the above process, the first duration determined when the terminal device needs to activate the first antenna panel is smaller duration of A+T and X+KB, or is X+KB. Because both of the duration are greater than duration required by the terminal device to activate the first antenna panel, the

TABLE 1

| Subcarrier spacing (SCS) identifier | Z: timed by the quantity of symbols | Z': timed by the quantity of symbols |
|---|---|---|
| 0, indicating that the SCS is 15 KHz | 22 | X1 |
| 1, indicating that the SCS is 30 KHz | 33 | X2 |
| 2, indicating that the SCS is 60 KHz | min(44, X3 + KB1) | X3 |
| 3, indicating that the SCS is 120 KHz | min(97, X4 + KB2) | X4 | terminal device has enough time to activate a new antenna panel to measure a reference signal.

In a possible implementation, when it is determined not to activate the first antenna panel, the first duration is determined based on a second constraint relationship. The second constraint relationship meets the following form: Z=min(A, X+KB').

$$KB'=KB-T.$$

In the above process, when the terminal device does not need to activate the first antenna panel, the first duration is smaller duration of A and X+KB', and is less than the first duration determined when the terminal device needs to activate the first antenna panel, thereby reducing duration between a moment at which the terminal device measures the reference signal and the moment at which the terminal device reports the channel state information, and improving efficiency.

In a possible implementation, before the receiving at least one reference signal from a network device, the method further includes:

receiving first information from the network device, where the first information is used to indicate to activate the first antenna panel.

In a possible implementation, the first information is carried in the PDCCH, the first information is carried in radio resource control RRC signaling, or the first information is carried in media access control MAC control element CE signaling.

In a possible implementation, before the receiving at least one reference signal from a network device, the method further includes:

sending second information to the network device, where the second information is used to indicate whether the terminal device is to activate the first antenna panel, and measure the at least one reference signal by using the first antenna panel.

In a possible implementation, the method further includes:

when duration between a first moment and a second moment is greater than or equal to a difference value obtained by subtracting the beam reporting timing from the first duration, measuring the reference signal by using the first antenna panel.

The first moment is a moment at which the last reference signal in the at least one reference signal is received, and the second moment is a moment at which the PDCCH is received.

In a possible implementation, when the duration between the first moment and the second moment is less than the difference value obtained by subtracting the beam reporting timing from the first duration, the reference signal is measured before a third moment by using a beam that is in a default direction and that is generated by a second antenna panel.

The reference signal is measured after the third moment by using the first antenna panel. Duration between the third moment and the second moment is equal to the difference value obtained by subtracting the beam reporting timing from the first duration. The second antenna panel is an antenna panel that has been activated when the PDCCH is received.

In a possible implementation, when the duration between the first moment and the second moment is less than the difference value obtained by subtracting the beam reporting timing from the first duration, the reference signal is measured before a fourth moment by using a beam that is in a default direction and that is generated by the second antenna panel.

The reference signal is measured after the fourth moment by using the second antenna panel in a beam scanning manner. Duration between the fourth moment and the second moment is equal to a difference value obtained by subtracting the duration required for activating one antenna panel from the beam reporting timing. The second antenna panel is an antenna panel that has been activated when the PDCCH is received.

In a possible implementation, the beam reporting timing is greater than the duration required for activating one antenna panel.

In a possible implementation, when a subcarrier spacing for transmitting the at least one reference signal is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing for transmitting the at least one reference signal is 120 KHz, A is equal to 97, T is any value in a set {56, 84, 112, 140, 168, 224, 336}, X is any value in a set {14, 28, 56}, and KB is any value in a set {14, 28, 48, 224, 336}.

According to a second aspect, this application further provides a communication apparatus. The communication apparatus has a function of implementing any method provided in the first aspect. The communication apparatus may be implemented by hardware, or may be implemented by hardware executing corresponding software. The hardware or the software includes one or more units corresponding to the foregoing function.

In a possible implementation, the communication apparatus includes a processor, and the processor is configured to support the communication apparatus in performing a corresponding function of the terminal device in the foregoing communication method. The communication apparatus may further include a memory, and the memory may be coupled to the processor, and store program instructions and data that are necessary for the communication apparatus. Optionally, the communication apparatus further includes a communication interface, and the communication interface is configured to support communication between the communication apparatus and a device such as a network device.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to descriptions in the method according to the first aspect. The details are not described herein again.

According to a third aspect, this application further provides a method, including: determining a first resource based on first duration, where the first resource is used by a terminal device to report channel state information, and indicating the first resource to the terminal device. When it is determined that the terminal device is to activate a first antenna panel and measure a reference signal by using the first antenna panel, the first duration is determined based on a first constraint relationship. The first antenna panel is any antenna panel that is currently not activated by the terminal device. The first duration is a time interval between a moment at which a PDCCH is sent and a moment at which the terminal device reports the channel state information. The first constraint relationship meets the following form: Z=min(A+T, X+KB) or Z=X+KB. The PDCCH is used to schedule the reference signal. Z indicates the first duration, min( ) indicates a minimization operation, A is first preset duration, T is duration required by the terminal device to activate one antenna panel, X indicates beam reporting timing reported by the terminal device, and KB indicates beam switching timing reported by the terminal device.

In the above process, the first duration determined when the terminal device needs to activate the first antenna panel is smaller duration of A+T and X+KB, or is X+KB. Because both of the duration are greater than duration required by the terminal device to activate the first antenna panel, the terminal device has enough time to activate a new antenna panel to measure the reference signal.

In a possible implementation, when it is determined that the terminal device is not to activate the first antenna panel, the first duration is determined based on a second constraint relationship.

The second constraint relationship meets the following form: Z=min(A, X+KB').

KB'=KB−T.

In a possible implementation, before the indicating the first resource to the terminal device, the method further includes:

sending first information to the terminal device, where the first information is used to indicate to activate the first antenna panel.

In a possible implementation, before the indicating the first resource to the terminal device, the method further includes:

receiving second information from the terminal device, where the second information is used to indicate whether the terminal device is to activate the first antenna panel, and measure at least one reference signal by using the first antenna panel.

In a possible implementation, the beam reporting timing is greater than the duration required for activating one antenna panel.

In a possible implementation, when a subcarrier spacing of the first resource is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing of the first resource is 120 KHz, A is equal to 97, T is any value in a set {56, 84, 112, 140, 168, 224, 336}, X is any value in a set {14, 28, 56}, and KB is any value in a set {14, 28, 48, 224, 336}.

According to a fourth aspect, this application further provides a communication apparatus. The communication apparatus has a function of implementing any method provided in the third aspect. The communication apparatus may be implemented by hardware, or may be implemented by hardware executing corresponding software. The hardware or the software includes one or more units corresponding to the foregoing function.

In a possible implementation, the communication apparatus includes a processor, and the processor is configured to support the communication apparatus in performing a corresponding function of the network device in the foregoing method. The communication apparatus may further include a memory, and the memory may be coupled to the processor, and store program instructions and data that are necessary for the communication apparatus. Optionally, the communication apparatus further includes a communication interface, and the communication interface is configured to support communication between the communication apparatus and a terminal device.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to the description in the method provided in the third aspect, and details are not described herein again.

According to a fifth aspect, this application provides a communication apparatus. The communication apparatus includes a processor. When the processor executes a computer program or instructions in a memory, the method according to the first aspect is performed.

According to a sixth aspect, this application provides a communication apparatus. The communication apparatus includes a processor. When the processor executes a computer program or instructions in a memory, the method according to the third aspect is performed.

According to a seventh aspect, this application provides a communication apparatus. The communication apparatus includes a processor and a memory. The memory is configured to store a computer program or instructions. The processor is configured to execute the computer program or the instructions stored in the memory, so that the communication apparatus performs the corresponding method shown in the first aspect.

According to an eighth aspect, this application provides a communication apparatus. The communication apparatus includes a processor and a memory. The memory is configured to store a computer program or instructions. The processor is configured to execute the computer program or the instructions stored in the memory, so that the communication apparatus performs the corresponding method shown in the third aspect.

According to a ninth aspect, this application provides a communication apparatus. The communication apparatus includes a processor, a memory, and a transceiver. The transceiver is configured to receive a signal or send a signal. The memory is configured to store a computer program or instructions. The processor is configured to invoke the computer program or the instructions from the memory to perform the method according to the first aspect.

According to a tenth aspect, this application provides a communication apparatus. The communication apparatus includes a processor, a memory, and a transceiver. The transceiver is configured to receive a signal or send a signal. The memory is configured to store a computer program or instructions. The processor is configured to invoke the computer program or the instructions from the memory to perform the method according to the third aspect.

According to an eleventh aspect, this application provides a communication apparatus. The communication apparatus includes a processor and an interface circuit. The interface circuit is configured to receive code instructions and transmit the code instructions to the processor, and the processor runs the code instructions to perform the corresponding method according to the first aspect.

According to a twelfth aspect, this application provides a communication apparatus. The communication apparatus includes a processor and an interface circuit. The interface circuit is configured to receive code instructions and transmit the code instructions to the processor, and the processor runs the code instructions to perform the corresponding method according to the third aspect.

According to a thirteenth aspect, this application provides a computer-readable storage medium. The computer-readable storage medium is configured to store a computer program or instructions. When a computer reads and executes the computer program or the instructions, the method according to the first aspect is implemented.

According to a fourteenth aspect, this application provides a computer-readable storage medium. The computer-readable storage medium is configured to store a computer program or instructions. When a computer reads and executes the computer program or the instructions, the method according to the third aspect is implemented.

According to a fifteenth aspect, this application provides a computer program product including instructions. When a computer reads and executes the computer program product, the method according to the first aspect is implemented.

According to a sixteenth aspect, this application provides a computer program product including instructions. When a computer reads and executes the computer program product, the method according to the third aspect is implemented.

According to a seventeenth aspect, this application provides a chip including a processor. The processor is coupled to a memory, and is configured to execute a computer program or instructions stored in the memory. When the processor executes the computer program or the instructions, the method according to the first aspect is implemented.

According to an eighteenth aspect, this application provides a chip including a processor. The processor is coupled to a memory, and is configured to execute a computer program or instructions stored in the memory. When the processor executes the computer program or the instructions, the method according to the third aspect is implemented.

According to a nineteenth aspect, this application provides a system, including the terminal device according to the second aspect and the network device according to the fourth aspect.

DESCRIPTION OF EMBODIMENTS

The following further describes in detail embodiments of this application with reference to the accompanying drawings.

The technical solution of embodiments of this application may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system. This is not limited herein.

Figure 1:
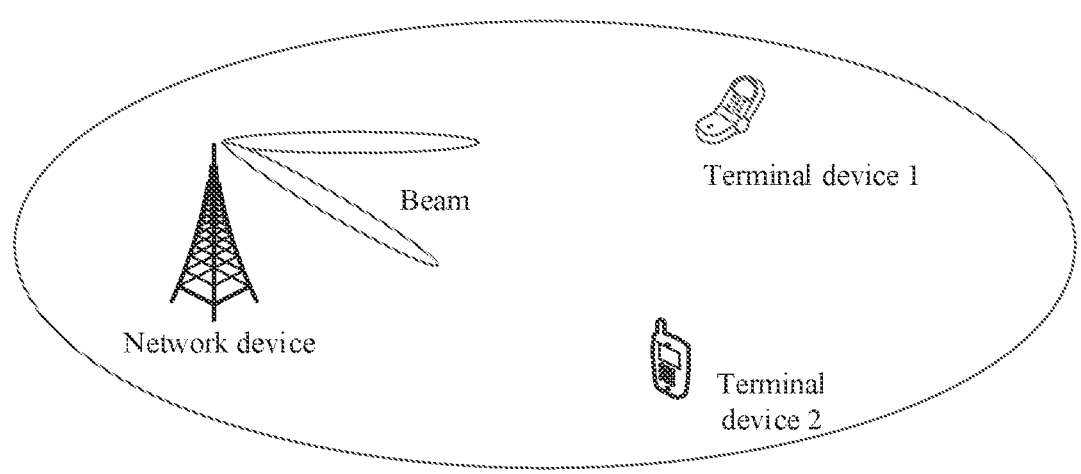
FIG. 1 is a schematic diagram of an architecture of a communication system applicable to an embodiment of this application.

For ease of understanding embodiments of this application, a communication system shown in FIG. 1 is first used as an example to describe in detail a communication system applicable to embodiments of this application. FIG. 1 shows an architecture of a possible communication system applicable to the methods provided in embodiments of this application. The architecture of the communication system includes a network device and at least one terminal device. The network device may establish a communication link with the at least one terminal device (for example, a terminal device 1 and a terminal device 2 shown in the figure) by using beams in different directions. The network device may provide a wireless access-related service for the at least one terminal device, to implement one or more of the following functions: a wireless physical layer function, resource scheduling and radio resource management, quality of service (QoS) management, radio access control, and a mobility management function. The at least one terminal device may also form a beam for data transmission with the network device. In this embodiment, the network device may communicate with the at least one terminal device by using the beam.

It should be noted that the architecture of the communication system shown in FIG. 1 is not limited to including only the devices shown in the figure, and may further include another device not shown in the figure. Details are not described herein in this application one by one.

The following first provides definitions of technical terms that may occur in embodiments of this application.

Reference signal resource: In embodiments of this application, a resource for sending a reference signal by the network device may be referred to as a reference signal resource. The reference signal may be any one of the following signals: a synchronization signal, a broadcast channel, a broadcast signal demodulation signal, a channel state information reference signal (CSI-RS), a cell specific reference signal (CS-RS), a user equipment specific reference signal (US-RS), a downlink control channel demodulation reference signal, a downlink data channel demodulation reference signal, a downlink phase noise tracking signal, or the like.

Beam: A beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be transmitted by using different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted through an antenna, and a receive beam may be distribution of signal strength, in different directions in space, of a radio signal received from an antenna. It may be understood that one or more antenna ports forming one beam may also be considered as one antenna port set. In a protocol, the beam may also be embodied as a spatial filter.

Quasi-co-location (QCL): A co-location relationship is used to indicate that a plurality of resources have one or more same or similar communication features. A same or similar communication configuration may be used for the plurality of resources having the co-location relationship. For example, if two antenna ports have the co-location relationship, a large-scale channel property in which one port transmits a symbol may be inferred from a large-scale channel property in which the other port transmits a symbol. The large-scale property may include delay spread, an average delay, Doppler spread, a Doppler frequency shift, an average gain, a receive parameter, a receive beam number of a terminal device, transmit/receive channel correlation, an angle of arrival, spatial correlation of a receiver antenna, a dominant angle of arrival (AoA), an average angle of arrival, AoA spread, and the like.

Spatial quasi-co-location (spatial QCL). The spatial QCL may be considered as a type of QCL. Spatial may be understood from the perspective of a transmit end or a receive end. From the perspective of the transmit end, if two antenna ports are spatially quasi-co-located, it means that beam directions corresponding to the two antenna ports are the same in space, that is, spatial filters are the same. From the perspective of the receive end, if two antenna ports are spatially quasi-co-located, it means that the receive end can receive, in a same beam direction, signals sent by the two antenna ports, that is, the two antenna ports are QCLed on a receive parameter.

Reference to "an embodiment", "some embodiments", or the like described in this specification means that one or more embodiments of this application include a specific feature, structure, or characteristic described with reference to embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

For example, the terminal device may include a radio resource control (RRC) signaling interworking module, a media access control (MAC) signaling interworking module, and a physical (PHY) signaling interworking module. The RRC signaling interworking module may be a module that is used by the network device and the terminal device to send and receive RRC signaling. The MAC signaling interworking module may be a module that is used by the network device and the terminal device to send and receive MAC control element (CE) signaling. PHY signaling and data may be a module used by the network device and the terminal device to send and receive uplink control signaling or downlink control signaling, uplink and downlink data, or downlink data.

The network device in embodiments of this application may be a device used to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario, or the network device may be a relay station, an access point, an in-vehicle device, a wearable device, and an access network device (such as a gNB) in a 5G network or an access network device in a future evolved PLMN network. This is not limited in embodiments of this application.

For example, the network device may also include an RRC signaling interworking module, a MAC signaling interworking module, and a PHY signaling interworking module.

In some deployment, the network device may include a centralized unit (CU) and a distributed unit (DU). The network device may further include an active antenna unit (AAU). The CU implements some functions of the network device, and the DU implements some functions of the network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in a radio access network (RAN), or may be classified into a network device in a core network (CN). This is not limited in this application.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Figure 2:
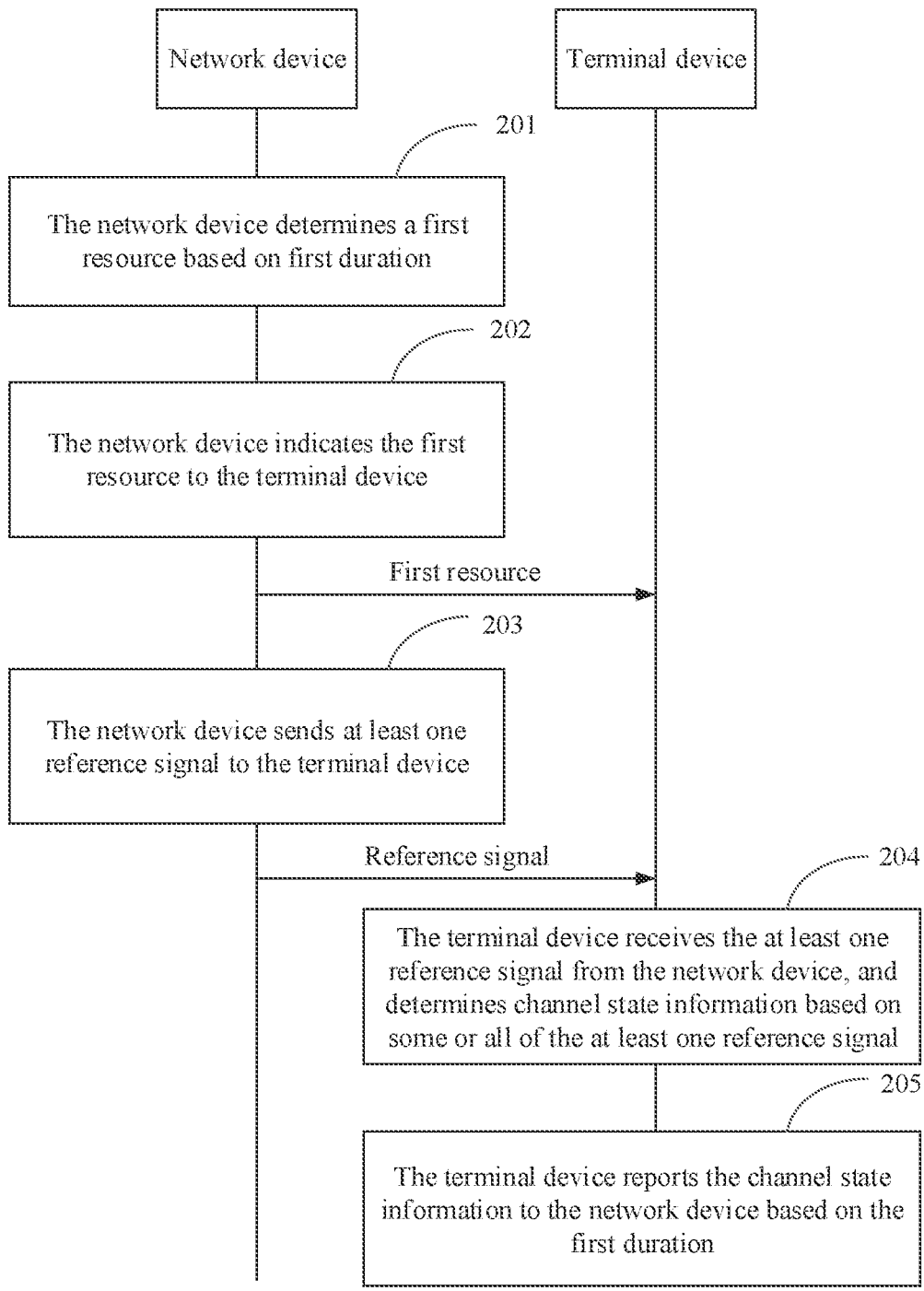
FIG. 2 is a schematic flowchart of a reference signal measurement method according to an embodiment of this application.

With reference to the foregoing description, FIG. 2 is a schematic flowchart of a reference signal measurement method according to an embodiment of this application. A process shown in FIG. 2 may be applied to a beam training process. In FIG. 2, interaction between a terminal device and a network device is used as an example for description. The method provided in this embodiment of this application may be further applied to another execution body, for example, a chip or a module in the terminal device, and a chip or a module in the network device. When the execution body is a chip or a module, reference may be made to the following description, and details are not described herein. Refer to FIG. 2. The method includes the following steps.

Step 201: A network device determines a first resource based on first duration.

The first resource is used by a terminal device to report channel state information.

The first duration is a time interval between a moment at which the network device sends a PDCCH that triggers a reference signal and a moment at which the terminal device reports channel state information.

Figure 3:
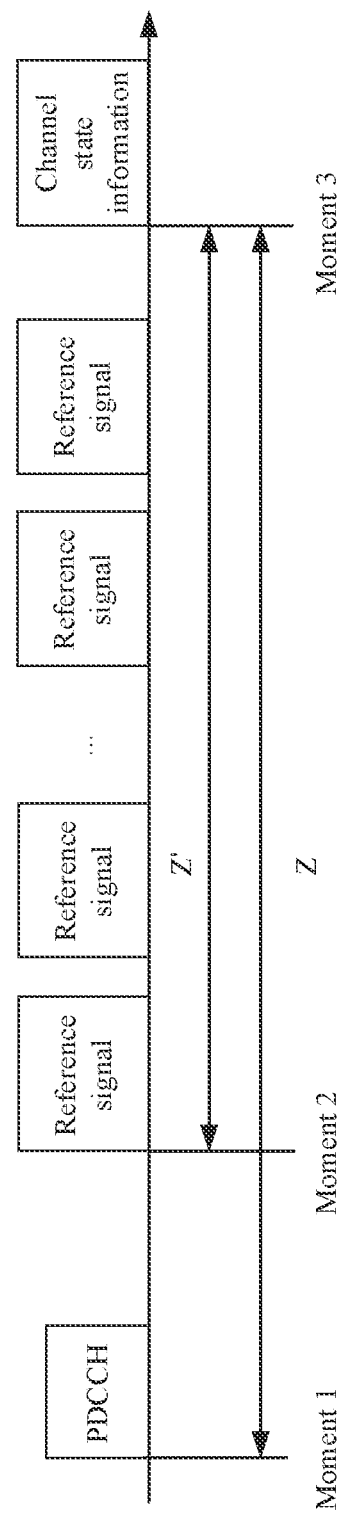
FIG. 3 is a schematic sequence diagram of reference signal measurement according to an embodiment of this application.

In this step, the network device determines, based on the first duration, a start moment of a resource used by the terminal device to report the channel state information. For example, as shown in FIG. 3, the network device sends the PDCCH at a moment 1. After determining the first duration, the network device may determine that a time interval between a start moment of the first resource for transmitting the channel state information by the terminal device and the moment 1 is the first duration, so that it is determined that the start moment of the first resource may be a moment 3.

It should be noted that in this embodiment of this application, before sending the reference signal, the network device sends downlink control information to the terminal device by using the PDCCH, and the downlink control information is used to schedule at least one reference signal resource. The network device sends at least one reference signal by using the at least one reference signal resource scheduled by using the downlink control information. Because the downlink control information is sent by using the PDCCH, the at least one reference signal may be considered to be scheduled by the PDCCH.

Step 202: The network device indicates the first resource to the terminal device.

How the network device specifically indicates the first resource is not limited in this embodiment of this application, and details are not described herein.

After indicating the first resource, the network device may further send the PDCCH to the terminal device. The PDCCH is used to schedule the at least one reference signal.

Step 203: The network device sends at least one reference signal to the terminal device.

Step 204: The terminal device receives the at least one reference signal from the network device, and determines channel state information based on some or all of the at least one reference signal.

The channel state information determined by the terminal device may include but is not limited to information such as a channel quality indicator (CQI), a precoding matrix indicator (PMI), and a rank indication (RI). How the terminal device specifically determines the channel state information is not limited in this embodiment of this application. For details, refer to description in an existing standard.

Step 205: The terminal device reports the channel state information to the network device based on the first duration.

It should be noted that the resource used by the terminal device to report the channel state information is scheduled by the network device. For example, the terminal device may obtain the first resource indicated by the network device, and the terminal device may report the channel state information by using the first resource.

In step 201 and step 205, the network device and the terminal device may determine the first duration by using a same method. Specifically, when it is determined that the terminal device is to activate a first antenna panel and measure the reference signal by using the first antenna panel, the first duration may be determined based on a first constraint relationship. The first antenna panel is any antenna panel that is currently not activated by the terminal device. The first constraint relationship meets the following form: $Z=\min(A+T, X+KB)$ or $Z=X+KB$.

When it is determined that the first antenna panel is not to be activated, the first duration may be determined based on a second constraint relationship. The second constraint relationship meets the following form: $Z=\min(A, X+KB')$.

Z indicates the first duration, min( ) indicates a minimization operation, A is first preset duration, T is duration required to activate one antenna panel, X indicates beam reporting timing reported by the terminal device, KB indicates beam switching timing reported by the terminal device, and KB'=KB−T. Z is in a unit of symbol.

Optionally, in this embodiment of this application, the beam reporting timing reported by the terminal device is greater than duration required by the terminal device to activate one antenna panel.

In the above process, the first duration determined when the terminal device needs to activate the first antenna panel is smaller duration of A+T and X+KB, or is X+KB. Because both of the duration are greater than duration required by the terminal device to activate the first antenna panel, the terminal device has enough time to activate a new antenna panel to measure the reference signal.

Correspondingly, when the terminal device does not need to activate the first antenna panel, the first duration is smaller duration of A and X+KB', and is less than the first duration determined when the terminal device needs to activate the first antenna panel, thereby reducing duration between a moment at which the terminal device measures the reference signal and the moment at which the terminal device reports the channel state information, and improving efficiency.

It should be noted that the first constraint relationship and the second constraint relationship provided in this embodiment of this application may be applied to a scenario in which a subcarrier spacing used by the terminal device is greater than or equal to a preset subcarrier spacing, for example, greater than or equal to 60 KHz. When the subcarrier spacing used by the terminal device is less than the preset subcarrier spacing, the terminal device and the network device may determine the first duration by using a method in a conventional technology.

For example, when the subcarrier spacing used by the terminal device is 15 KHz, the first duration may be 22 symbols. When the subcarrier spacing used by the terminal device is 30 KHz, the first duration may be 33 symbols.

refers to a modulation symbol, such as an orthogonal frequency division multiplexing (OFDM) symbol.

In this embodiment of this application, the terminal device may report the beam reporting timing and the beam switching timing to the network device before the network device sends the reference signal. Further, the terminal device may further report, to the network device, duration T required for activating one antenna panel.

For example, the beam reporting timing and the beam switching timing that are reported by the terminal device may be shown in Table 2.

TABLE 2

| Subcarrier spacing | X: Beam reporting timing | KB: Beam switching timing |
|---|---|---|
| 15 KHz | X1: X1 is a value selected by the terminal device from a set {2, 4, 8}. | N/A |
| 30 KHz | X2: X2 is a value selected by the terminal device from a set {4, 8, 14, 28}. | N/A |
| 60 KHz | X3: X3 is a value selected by the terminal device from a set {8, 14, 28}. | KB1: KB1 is a value selected by the terminal device from a set {14, 28, 48, 224, 336}. |
| 120 KHz | X4: X4 is a value selected by the terminal device from a set {14, 28, 56}. | KB2: KB2 is a value selected by the terminal device from a set {14, 28, 48, 224, 336}. |
| 240 KHz | X5: X5 is a value selected by the terminal device from a set {28, 56, 112}. | KB3: KB3 is a value selected by the terminal device from a set {14, 28, 48, 224, 336, 448, 672}. |
| 480 KHz | X6: X6 is a value selected by the terminal device from a set {56, 112, 224}. | KB4: KB4 is a value selected by the terminal device from a set {14, 28, 48, 224, 336, 448, 672, 896}. |
| 960 KHz | X7: X7 is a value selected by the terminal device from a set {112, 224, 448}. | KB5: KB5 is a value selected by the terminal device from a set {14, 28, 48, 224, 336, 448, 672, 896, 1344}. |

Two parameters Z and Z' are involved in this embodiment of this application. Z indicates a time interval between a moment at which the network device sends the PDCCH and a moment at which the terminal device reports the channel state information. In this embodiment of this application, for ease of description, Z may also be referred to as first duration. Z' indicates a time interval between a moment at which the network device sends the reference signal and a moment at which the terminal device reports the channel state information.

For example, as shown in FIG. 3, it is assumed that the network device sends the PDCCH at the moment 1, and sends the at least one reference signal at a moment 2, and the terminal device starts to report, at a moment 3, the channel state information determined based on the reference signal. With reference to FIG. 3, Z may refer to a time interval between the moment 1 and the moment 3 in FIG. 3. Before the moment 3, the terminal device needs to prepare for reporting the channel state information, including measuring corresponding channel state information, calculating a reporting quantity required by the network device, encoding the channel state information into a reporting format that meets a protocol requirement, and the like.

With reference to FIG. 3, Z' may refer to a time interval between the moment 2 and the moment 3 in FIG. 3.

Z' may be determined based on the beam reporting timing reported by the terminal device. Specifically, the beam reporting timing reported by the terminal device may be used as Z'.

It should be noted that in this embodiment of this application, Z and Z' are in a unit of symbol, and the symbol In Table 2, the determined beam reporting timing or beam switching timing may be different when the subcarrier spacing used by the terminal device is different. For example, when the subcarrier spacing is 60 KHz, the terminal device may select one value from the set {8, 14, 28} as the beam reporting timing, and select one value from the set {14, 28, 48, 224, 336} as the beam switching timing. Specific values may be determined based on an actual situation. This is not limited in this embodiment of this application.

It should be noted that the terminal device may not report all content in Table 2 to the network device, but may report one or more items in Table 2. Specific content to be reported may be determined based on an actual situation.

For another example, the duration T reported by the terminal device and required for activating one antenna panel and the first preset duration A may be shown in Table 3.

TABLE 3

| Subcarrier spacing | T: duration required for activating one antenna panel |
|---|---|
| 60 KHz | T1: T1 is a value selected by the terminal device from a set {56, 84, 112, 140, 168, 224, 336}. |
| 120 KHz | T2: T2 is a value selected by the terminal device from a set {112, 168, 224, 280, 336}. |
| 240 KHz | T3: T3 is a value selected by a terminal device from a set {224, 280, 336, 448, 672}. |
| 480 KHz | T4: T4 is a value selected by the terminal device from a set {336, 448, 672, 784, 896}. |
| 960 KHz | T5: T5 is a value selected by the terminal device from a set {672, 784, 896, 1232, 1344}. |

In Table 3, a value to be selected by the terminal device from the set as the duration required for activating one antenna panel may be determined based on an actual situation. This is not limited in this embodiment of this application.

It should be noted that the terminal device may not report all content in Table 3 to the network device, but may report one or more items in Table 3. Specific content to be reported may be determined based on an actual situation.

It should be noted that, in this embodiment of this application, the first preset duration A may be determined based on the conventional technology. For example, the first preset duration A may be shown in Table 4.

TABLE 4

| Subcarrier spacing | A: first preset duration |
|---|---|
| 60 KHz | 44 |
| 120 KHz | 97 |
| 240 KHz | 143 |
| 480 KHz | 187 |
| 960 KHz | 231 |

Certainly, the foregoing is merely an example. The beam reporting timing, the beam switching timing, and the duration required for activating one antenna panel that are reported by the terminal device may alternatively have other values. Details are not described herein by using examples one by one.

With reference to the foregoing description, the terminal device and the network device may determine Z and Z' based on a correspondence shown in Table 5.

TABLE 5

| Subcarrier spacing | Z | Z' |
|---|---|---|
| 15 KHz | 22 | X1 |
| 30 KHz | 33 | X2 |
| 60 KHz | When the first antenna panel is activated: min(44 + T1, X3 + KB1) or X3 + KB1; when the first antenna panel is not activated: min(44, X3 + KB'1); KB'1 = KB1 − T1 | X3 |
| 120 KHz | When the first antenna panel is activated: min(97 + T2, X4 + KB2) or X4 + KB2; when the first antenna panel is not activated: min(97, X4 + KB'2); KB'2 = KB2 − T2 | X4 |
| 240 KHz | When the first antenna panel is activated: min(143 + T3, X5 + KB3) or X5 + KB3; when the first antenna panel is not activated: min(143, X5 + KB'3); KB'3 = KB3 − T3 | X5 |
| 480 KHz | When the first antenna panel is activated: min(187 + T4, X6 + KB4) or X6 + KB4; when the first antenna panel is not activated: min(187, X6 + KB'4); KB'4 = KB4 − T4 | X6 |
| 960 KHz | When the first antenna panel is activated: min(231 + T5, X7 + KB5) or X7 + KB5; when the first antenna panel is not activated: min(231, X7 + KB'5); KB'5 = KB5 − T5 | X7 |

In Table 5, X1 to X7, T1 to T5, and KB1 to KB5 are values reported by the terminal device to the network device. For specific values of the parameters, refer to the foregoing example and description. Details are not described herein again.

Optionally, the terminal device may further indicate, to the network device, whether the terminal device can activate a new antenna panel during reference signal measurement, and the network device may thus determine whether the terminal device has a capability of activating a new antenna panel during reference signal measurement. When determining that the terminal device cannot activate a new antenna panel during reference signal measurement, the network device may determine the first duration by using the second constraint relationship.

In this embodiment of this application, different implementations may be used to determine whether the terminal device is to activate the first antenna panel. In a possible implementation, when determining that the terminal device can activate a new antenna panel during reference signal measurement, the network device may send first information to the terminal device. The first information is used to indicate to activate the first antenna panel. In this method, the network device may determine, whether the terminal device is to activate the first antenna panel, and the network device and the terminal device may thus determine to use the first constraint relationship or the second constraint relationship to determine the first duration.

In another possible implementation, the terminal device may send second information to the network device. The second information is used to indicate whether the terminal device is to activate the first antenna panel, and measure the at least one reference signal by using the first antenna panel. In this method, the network device may determine whether the terminal device is to activate the first antenna panel, and the network device and the terminal device may thus determine to use the first constraint relationship or the second constraint relationship to determine the first duration.

Optionally, before sending the reference signal, the network device may further indicate, to the terminal device, the reference signal resource for sending the reference signal.

For example, the network device may configure one or more trigger states (trigger state). Each trigger state may be associated with one or more report configurations (Report Config). Each report configuration may configure information such as a reporting quantity, or may be associated with one or more resource configurations (Resource Config). Each resource configuration includes one or more resource sets (Resource set), and each resource set includes one or more resources (Resource). Each resource configuration further includes information such as a time-frequency location of a resource, a port quantity, and QCL information. The network device indicates the configured trigger state to the terminal device, so that the terminal device can determine the reference signal resource corresponding to the reference signal.

Before sending the reference signal, the network device sends the PDCCH to the terminal device. The PDCCH includes downlink control information. The terminal device receives the PDCCH, and obtains the downlink control information in the PDCCH.

The terminal device may determine, based on the downlink control information, the reference signal resource corresponding to the reference signal. Specifically, the downlink control information includes a channel state information request field, and the channel state information request field is used to indicate a trigger state configured by the network device. For example, the channel state information request field is 3-bit information 001, and may be used to indicate the second trigger state configured by the network device. An association relationship (or a mapping relationship) between a value of the channel state information request field and a trigger state may be predefined by using a network configuration or a protocol, which is not limited in the embodiment of this application.

The terminal determines a corresponding trigger state based on the channel state information request field in the downlink control information, so that the terminal can determine, based on the trigger state, resources that need to be measured, a measurement amount, a QCL hypothesis to be used for measurement, and a reporting quantity.

In this embodiment of this application, after determining the first duration, the network device may set a time interval between a transmission start moment of the PDCCH and a transmission start moment of the at least one reference signal scheduled by the PDCCH to be greater than or equal to a difference value between the first duration and the beam reporting timing reported by the terminal device, so that the terminal device obtains enough time to activate a new antenna panel.

Correspondingly, after determining the first duration, the terminal device may determine when to report the channel state information. For example, with reference to FIG. 3, the terminal device receives the PDCCH at the moment 1, and the terminal device may determine to report the channel state information at the moment 3. A difference value between the moment 1 and the moment 3 is the first duration.

It should be noted that if the terminal device needs to accurately report the channel state information based on the first duration, the terminal device needs to complete, within Z–Z' after the PDCCH is received, adjustment such as interpretation of the downlink control information in the PDCCH and activation of the first antenna panel, so that the reference signal can be measured based on the downlink control information. Z–Z' indicates a difference value obtained by subtracting Z' from Z.

If the terminal device determines that the reference signal cannot be measured based on the downlink control information, for example, within Z–Z' after the PDCCH is received, adjustment such as interpretation of the downlink control information in the PDCCH and activation of the first antenna panel is not completed, the terminal device may further measure the reference signal in another manner.

It is assumed that the terminal device receives the last reference signal in the at least one reference signal at the first moment, and the terminal device receives the PDCCH at the second moment.

In a possible implementation, when duration between the first moment and the second moment is greater than or equal to a difference value obtained by subtracting the beam reporting timing from the first duration, the terminal device measures the reference signal by using the first antenna panel.

When the duration between the first moment and the second moment is less than the difference value obtained by subtracting the beam reporting timing from the first duration, the terminal device measures the reference signal by a second antenna panel before a third moment. Specifically, the terminal device may measure the reference signal by using a beam that is in a default direction and that is generated by the second antenna panel. The default direction may be a beam direction for currently measuring a physical downlink shared channel (PDSCH), or may be a beam direction for measuring a control resource set (CORESET) of the PDCCH. If there are a plurality of CORESETs, a beam direction corresponding to a CORESET with a lowest CORESET identifier is selected.

The terminal device measures the reference signal by using the first antenna panel after the third moment. Specifically, the first antenna panel may be used to measure the reference signal in a beam scanning manner.

Duration between the third moment and the second moment is equal to the difference value obtained by subtracting the beam reporting timing from the first duration. The second antenna panel is an antenna panel that has been activated when the PDCCH is received.

In another possible implementation, when the duration between the first moment and the second moment is less than the difference value obtained by subtracting the beam reporting timing from the first duration, the terminal device may measure the reference signal by using the second antenna panel before a fourth moment. Specifically, the terminal device may measure the reference signal by using the beam that is in the default direction and that is generated by the second antenna panel.

The terminal device may measure the reference signal by using the second antenna panel after the fourth moment. Specifically, the second antenna panel may be used to measure the reference signal in the beam scanning manner.

Duration between the fourth moment and the second moment is equal to the difference value obtained by subtracting the duration required for activating one antenna panel from the beam reporting timing. The second antenna panel is an antenna panel that has been activated when the PDCCH is received.

In this embodiment of this application, after determining the channel state information, the terminal device may report the channel state information by using the first resource indicated by the network device. How the terminal device specifically reports the channel state information is not limited in this embodiment of this application, and details are not described herein.

Optionally, if the moment 1 plus the first duration (Z) and the moment 2 plus Z' are not a same moment, the later moment is used as a time requirement for reporting the channel state information by the terminal device.

Optionally, when the terminal device is configured to report the channel state information before the moment 1 plus the first duration (Z) or the moment 2 plus Z', the terminal device may give up reporting, or report channel state information that is not updated.

As described above, the network device may configure one or more trigger states. Each trigger state may be associated with one or more report configurations (Report Config). Each report configuration may configure information such as a reporting quantity, or may be associated with one or more resource configurations (Resource Config). Each resource configuration includes one or more resource sets (Resource set), and each resource set includes one or more resources (Resource).

Optionally, values of Z and Z' may also be related to a quantity of report configurations associated with the trigger state.

For example, when one trigger state is associated with M report configurations, $Z = \max_{m=0, \ldots, M-1}(Z(m))$, where the formula indicates that a maximum value of $Z(0)$ to $Z(M-1)$ is taken.

Correspondingly, $Z' = \max_{m=0, \ldots, M-1}(Z'(m))$, where the formula indicates that a maximum value of $Z'(0)$ to $Z'(M-1)$ is taken.

For an mth report configuration, for both $Z(m)$ and $Z'(m)$, refer to Z and Z' in Table 5.

For another example, when one trigger state is associated with M report configurations, $Z = \operatorname{sum}_{m=0, \ldots, M-1}(Z(m))$, where the formula indicates that $Z(0)$ to $Z(M-1)$ are accumulated.

Correspondingly, $Z'=\text{sum}_{m=0,\ldots,M-1}(Z'(m))$, where the formula indicates that $Z'(0)$ to $Z'(M-1)$ are accumulated. For an $m^{th}$ report configuration, for both $Z(m)$ and $Z'(m)$, refer to Z and Z' in Table 5.

Optionally, the values of Z and Z' may alternatively be related to a quantity of resources associated with the report configurations associated with the trigger state.

For example, if triggered resources include D channel measurement resources, B non-zero power interference measurement resources, and C zero power interference measurement resources, the values of Z and Z' may be D times, (D+B) times, or (D+B+C) times of the values of Z and Z' in Table 5. Values of D, B, and C are greater than or equal to 0, and may be specifically determined based on an actual situation. Details are not described herein.

Optionally, the values of Z and Z' may alternatively be related to a channel measurement capability reported by the terminal device. The channel measurement capability reported by the terminal device includes a quantity of CSI processing units (CPUs). A larger quantity of CPUs indicates smaller values of Z and Z'.

For example, the triggered resources include D channel measurement resources, B non-zero power interference measurement resources, and C zero power interference measurement resources. If the quantity of CPUs reported by the terminal device is 1, the values of Z and Z' may be D times of the values of Z and Z' in Table 5. If the quantity of CPUs reported by the terminal device is D, the values of Z and Z' may be the same as the values of Z and Z' in Table 5. Alternatively, if the quantity of CPUs reported by the terminal device is D, the values of Z and Z' may be twice or (D+B)/D times of the values of Z and Z' in Table 5.

It should be noted that in this embodiment of this application, "greater than or equal to" may also be replaced with "greater than". Correspondingly, "less than or equal to" may also be replaced with "less than". "Greater than" may also be replaced with "greater than or equal to". Correspondingly, "less than" may also be replaced with "less than or equal to". For example, in the foregoing description, the duration between the first moment and the second moment is greater than or equal to the difference value obtained by subtracting the beam reporting timing from the first duration, or may be replaced with "the duration between the first moment and the second moment is greater than the difference value obtained by subtracting the beam reporting timing from the first duration". Another case may be deduced by analogy. Details are not described again.

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

In the foregoing embodiments provided in this application, the methods provided in embodiments of this application are separately described from the perspective of interaction between devices. To implement functions in the foregoing methods provided in embodiments of this application, the terminal device and the network device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

In embodiments of this application, module division is an example, and is merely a logical function division. During actual implementation, another division manner may be used. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 4:
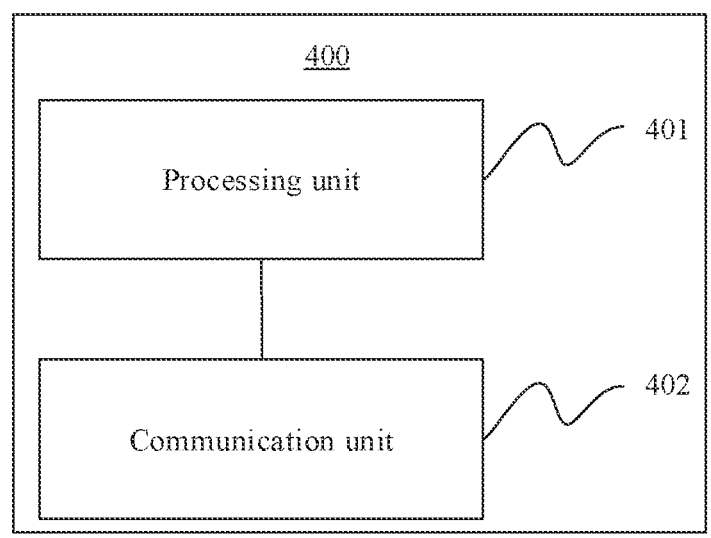
FIG. 4 is a schematic diagram of a structure of a communication apparatus according to an embodiment of this application.

Same as the foregoing concept, as shown in FIG. 4, an embodiment of this application further provides an apparatus 400, configured to implement a function of the terminal device or the network device in the foregoing methods. For example, the apparatus may be a software module or a chip system. In this embodiment of this application, the chip system may include a chip, or may include a chip and another discrete component. The apparatus 400 may include a processing unit 401 and a communication unit 402.

In this embodiment of this application, the communication unit may also be referred to as a transceiver unit, and may include a sending unit and/or a receiving unit, configured to respectively perform steps of sending and receiving by the terminal device or the network device in the above method embodiments.

Figure 5:
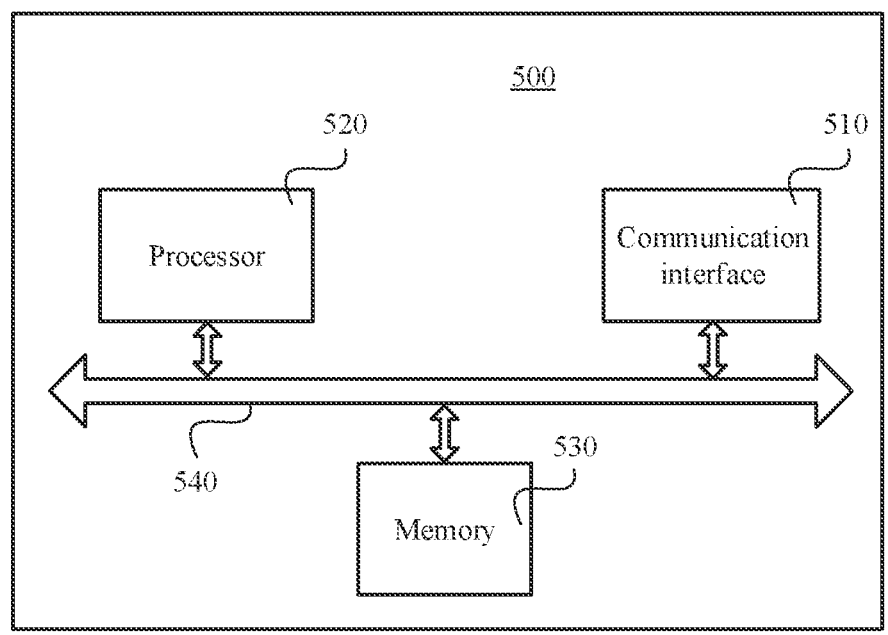
FIG. 5 is a schematic diagram of a structure of a communication apparatus according to an embodiment of this application.

The following describes in detail a communication apparatus in embodiments of this application with reference to FIG. 4 and FIG. 5. It should be understood that descriptions of the apparatus embodiments correspond to the descriptions of the method embodiments. Therefore, for content not described in detail, refer to the foregoing method embodiments. For brevity, details are not described herein again.

In a possible design, the apparatus 400 may implement the steps or processes performed by the terminal device or the network device in the above method embodiment. The following separately describes the steps or processes.

For example, when the apparatus 400 implements the function of the terminal device in the process shown in FIG. 2:

the communication unit 402 is configured to receive at least one reference signal from the network device, and determine channel state information based on some or all of the at least one reference signal; and report the channel state information to the network device based on first duration; and the processing unit 401 is configured to: when determining to activate a first antenna panel and measure the at least one reference signal by using the first antenna panel, determine the first duration based on a first constraint relationship. The first antenna panel is any antenna panel that is currently not activated.

The first duration is a time interval between a moment at which the network device sends a PDCCH and a moment at which the terminal device reports the channel state information, and the PDCCH is used to schedule the at least one reference signal. The first constraint relationship meets the following form: $Z=\min(A+T, X+KB)$ or $Z=X+KB$.

Z indicates the first duration, $\min()$ indicates a minimization operation, A is first preset duration, T is duration required to activate one antenna panel, X indicates beam reporting timing reported by the terminal device, and KB indicates beam switching timing reported by the terminal device.

In a possible implementation, the processing unit is further configured to:

when it is determined that the first antenna panel is not to be activated, determine the first duration based on a second constraint relationship.

The second constraint relationship meets the following form: Z=min(A, X+KB').

$KB'=KB-T.$

In a possible implementation, before receiving the at least one reference signal from the network device, the communication unit is further configured to:

receive first information from the network device. The first information is used to indicate to activate the first antenna panel.

In a possible implementation, before receiving the at least one reference signal from the network device, the communication unit is further configured to:

send second information to the network device. The second information is used to indicate whether the terminal device is to activate the first antenna panel, and measure the at least one reference signal by using the first antenna panel.

In a possible implementation, the communication unit 402 is further configured to:

when duration between a first moment and a second moment is greater than or equal to a difference value obtained by subtracting the beam reporting timing from the first duration, measure the reference signal by using the first antenna panel.

The first moment is a moment at which the last reference signal in the at least one reference signal is received, and the second moment is a moment at which the PDCCH is received.

In a possible implementation, the communication unit 402 is further configured to:

when the duration between the first moment and the second moment is less than the difference value obtained by subtracting the beam reporting timing from the first duration, measure the reference signal before a third moment by using a beam that is in a default direction and that is generated by a second antenna panel; and measure the reference signal after the third moment by using the first antenna panel. Duration between the third moment and the second moment is equal to the difference value obtained by subtracting the beam reporting timing from the first duration. The second antenna panel is an antenna panel that has been activated when the PDCCH is received.

In a possible implementation, the communication unit 402 is further configured to:

when the duration between the first moment and the second moment is less than the difference value obtained by subtracting the beam reporting timing from the first duration, measure the reference signal before a fourth moment by using a beam that is in a default direction and that is generated by the second antenna panel; and measure the reference signal before the fourth moment by using the second antenna panel in a beam scanning manner. Duration between the fourth moment and the second moment is equal to a difference value obtained by subtracting duration required for activating one antenna panel from the beam reporting timing. The second antenna panel is an antenna panel that has been activated when the PDCCH is received.

In a possible implementation, the beam reporting timing is greater than the duration required for activating one antenna panel.

In a possible implementation, when a subcarrier spacing for transmitting the at least one reference signal is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing for transmitting the at least one reference signal is 120 KHz, A is equal to 97, T is any value in a set {56, 84, 112, 140, 168, 224, 336}, X is any value in a set {14, 28, 56}, and KB is any value in a set {14, 28, 48, 224, 336}.

For example, when the apparatus 400 implements the function of the network device in the process shown in FIG. 2:

the processing unit 401 is configured to determine a first resource based on first duration, where the first resource is used by the terminal device to report channel state information; and the communication unit 402 is configured to indicate the first resource to the terminal device.

When it is determined that the terminal device is to activate a first antenna panel and measure a reference signal by using the first antenna panel, the first duration is determined based on a first constraint relationship. The first antenna panel is any antenna panel that is currently not activated by the terminal device. The first duration is a time interval between a moment at which a PDCCH is sent and a moment at which the terminal device reports the channel state information. The first constraint relationship meets the following form: Z=min(A+T, X+KB) or Z=X+KB. The PDCCH is used to schedule the reference signal.

Z indicates the first duration, min( ) indicates a minimization operation, A is first preset duration, T is duration required by the terminal device to activate one antenna panel, X indicates beam reporting timing reported by the terminal device, and KB indicates beam switching timing reported by the terminal device.

In a possible implementation, the processing unit 401 is further configured to:

when it is determined that the terminal device is not to activate the first antenna panel, determine the first duration based on a second constraint relationship.

The second constraint relationship meets the following form: Z=min(A, X+KB').

$KB'=KB-T.$

In a possible implementation, before indicating the first resource to the terminal device, the communication unit 402 is further configured to:

send first information to the terminal device. The first information is used to indicate to activate the first antenna panel.

In a possible implementation, before indicating the first resource to the terminal device, the communication unit 402 is further configured to:

receive second information from the terminal device. The second information is used to indicate whether the terminal device is to activate the first antenna panel, and measure the at least one reference signal by using the first antenna panel.

In a possible implementation, the beam reporting timing is greater than the duration required for activating one antenna panel.

In a possible implementation, when a subcarrier spacing of the first resource is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing of the first resource is 120 KHz, A is equal to 97, T is any value in a set {56, 84, 112, 140, 168, 224, 336}, X is any value in a set {14, 28, 56}, and KB is any value in a set {14, 28, 48, 224, 336}.

FIG. 5 shows an apparatus 500 according to an embodiment of this application. The apparatus shown in FIG. 5 may be an implementation of a hardware circuit of the apparatus shown in FIG. 4. The communication apparatus may be applied to the flowchart shown in FIG. 2, and perform functions of the terminal device or the network device in the foregoing method embodiments. For ease of description, FIG. 5 shows only main components of the communication apparatus.

The apparatus 500 shown in FIG. 5 includes at least one processor 520 configured to implement any method in FIG. 2 provided in the embodiment of this application.

The apparatus 500 may further include at least one memory 530 configured to store program instructions and/or data. The memory 530 is coupled to the processor 520. The coupling in this embodiment of this application may be an indirect coupling or a communication connection between apparatuses, units, or modules in an electrical form, a mechanical form, or another form, and is used for information exchange between the apparatuses, the units, or the modules. The processor 520 may operate in cooperation with the memory 530. The processor 520 may execute the program instructions stored in the memory 530. At least one of the at least one memory may be included in the processor.

In an implementation process, steps in the foregoing methods may be implemented by using a hardware integrated logical circuit in the processor or by using instructions in a form of software. The steps in the methods disclosed with reference to embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in this embodiment of this application may be an integrated circuit chip, and has a signal processing capability. In an implementation process, steps in the foregoing method embodiments may be implemented by using a hardware integrated logic circuit in the processor or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in this embodiment of this application, the memory may be a volatile memory or a non-volatile memory, or may include both a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that the memory in the system and the method described in this specification is intended to include, but not limited to, these memories and any memory of another proper type.

The apparatus 500 may further include a communication interface 510 configured to communicate with another device through a transmission medium, so that the apparatus 500 can communicate with the another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function or an interface circuit.

The apparatus 500 may further include a communication line 540. The communication interface 510, the processor 520, and the memory 530 may be connected to each other through the communication line 540. The communication line 540 may be a peripheral component interconnect (PCI for short) bus, an extended industry standard architecture (EISA) bus, or the like. The communication line 540 may be classified into an address bus, a data bus, a control bus, and the like. For ease of representation, only one thick line is used to represent the bus in FIG. 5, but this does not mean that there is only one bus or only one type of bus.

For example, when the apparatus 500 implements the function of the terminal device in the process shown in FIG. 2:

the communication interface 510 is configured to receive at least one reference signal from the network device, and determine channel state information based on some or all of the at least one reference signal; and report the channel state information to the network device based on first duration; and the processor 520 is configured to: when determining to activate a first antenna panel and measure the at least one reference signal by using the first antenna panel, determine the first duration based on a first constraint relationship. The first antenna panel is any antenna panel that is currently not activated.

The first duration is a time interval between a moment at which the network device sends a PDCCH and a moment at which the terminal device reports the channel state information, and the PDCCH is used to schedule the at least one reference signal. The first constraint relationship meets the following form: $Z=\min(A+T, X+KB)$ or $Z=X+KB$.

Z indicates the first duration, min( ) indicates a minimization operation, A is first preset duration, T is duration required to activate one antenna panel, X indicates beam reporting timing reported by the terminal device, and KB indicates beam switching timing reported by the terminal device.

In a possible implementation, the processor is further configured to:

when it is determined that the first antenna panel is not to be activated, determine the first duration based on a second constraint relationship.

The second constraint relationship meets the following form: $Z=\min(A, X+KB')$.

$KB'=KB-T.$

In a possible implementation, before receiving the at least one reference signal from the network device, the communication unit is further configured to:

receive first information from the network device. The first information is used to indicate to activate the first antenna panel.

In a possible implementation, before receiving the at least one reference signal from the network device, the communication unit is further configured to:

send second information to the network device. The second information is used to indicate whether the terminal device is to activate the first antenna panel, and measure the at least one reference signal by using the first antenna panel.

In a possible implementation, the communication interface 510 is further configured to:

when duration between a first moment and a second moment is greater than or equal to a difference value obtained by subtracting the beam reporting timing from the first duration, measure the reference signal by using the first antenna panel.

The first moment is a moment at which the last reference signal in the at least one reference signal is received, and the second moment is a moment at which the PDCCH is received.

In a possible implementation, the communication interface 510 is further configured to:

when the duration between the first moment and the second moment is less than the difference value obtained by subtracting the beam reporting timing from the first duration, measure the reference signal before a third moment by using a beam that is in a default direction and that is generated by a second antenna panel; and measure the reference signal after the third moment by using the first antenna panel. Duration between the third moment and the second moment is equal to the difference value obtained by subtracting the beam reporting timing from the first duration. The second antenna panel is an antenna panel that has been activated when the PDCCH is received.

In a possible implementation, the communication interface 510 is further configured to:

when the duration between the first moment and the second moment is less than the difference value obtained by subtracting the beam reporting timing from the first duration, measure the reference signal before a fourth moment by using a beam that is in a default direction and that is generated by the second antenna panel; and measure the reference signal before the fourth moment by using the second antenna panel in a beam scanning manner. Duration between the fourth moment and the second moment is equal to a difference value obtained by subtracting duration required for activating one antenna panel from the beam reporting timing. The second antenna panel is an antenna panel that has been activated when the PDCCH is received.

In a possible implementation, the beam reporting timing is greater than the duration required for activating one antenna panel.

In a possible implementation, when a subcarrier spacing for transmitting the at least one reference signal is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing for transmitting the at least one reference signal is 120 KHz, A is equal to 97, T is any value in a set {56, 84, 112, 140, 168, 224, 336}, X is any value in a set {14, 28, 56}, and KB is any value in a set {14, 28, 48, 224, 336}.

For example, when the apparatus 500 implements the function of the network device in the process shown in FIG. 2:

the processor 520 is configured to determine a first resource based on first duration, where the first resource is used by the terminal device to report channel state information; and the communication interface 510 is configured to indicate the first resource to the terminal device.

When it is determined that the terminal device is to activate a first antenna panel and measure a reference signal by using the first antenna panel, the first duration is determined based on a first constraint relationship. The first antenna panel is any antenna panel that is currently not activated by the terminal device. The first duration is a time interval between a moment at which a PDCCH is sent and a moment at which the terminal device reports the channel state information. The first constraint relationship meets the following form: $Z=\min(A+T, X+KB)$ or $Z=X+KB$. The PDCCH is used to schedule the reference signal.

Z indicates the first duration, min( ) indicates a minimization operation, A is first preset duration, T is duration required by the terminal device to activate one antenna panel, X indicates beam reporting timing reported by the terminal device, and KB indicates beam switching timing reported by the terminal device.

In a possible implementation, the processor 520 is further configured to:

when it is determined that the terminal device is not to activate the first antenna panel, determine the first duration based on a second constraint relationship.

The second constraint relationship meets the following form: $Z=\min(A, X+KB')$.

$KB'=KB-T.$

In a possible implementation, before indicating the first resource to the terminal device, the communication interface 510 is further configured to:

send first information to the terminal device. The first information is used to indicate to activate the first antenna panel.

In a possible implementation, before indicating the first resource to the terminal device, the communication interface 510 is further configured to:

receive second information from the terminal device. The second information is used to indicate whether the terminal device is to activate the first antenna panel, and measure the at least one reference signal by using the first antenna panel.

In a possible implementation, the beam reporting timing is greater than the duration required for activating one antenna panel.

In a possible implementation, when a subcarrier spacing of the first resource is 60 KHz, A is equal to 44, T is any value in a set {112, 168, 224, 280, 336}, X is any value in a set {8, 14, 28}, and KB is any value in a set {14, 28, 48, 224, 336}.

Alternatively, when a subcarrier spacing of the first resource is 120 KHz, A is equal to 97, T is any value in a set {56, 84, 112, 140, 168, 224, 336}, X is any value in a set {14, 28, 56}, and KB is any value in a set {14, 28, 48, 224, 336}.

According to the methods provided in embodiments of this application, this application further provides a computer program product. The computer program product includes computer program code. When the computer program code is run on a computer, the computer is enabled to perform the method according to any one of the embodiments shown in FIG. 2.

According to the methods provided in embodiments of this application, this application further provides a computer-readable medium. The computer-readable medium stores program code. When the program code is run on a computer, the computer is enabled to perform the method according to any one of the embodiments shown in FIG. 2.

According to the methods provided in embodiments of this application, this application further provides a system. The system includes the foregoing terminal device and the foregoing network device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A reference signal measurement method, comprising:
    receiving at least one reference signal from a network device;
    determining channel state information based on some or all of the at least one reference signal; and
    reporting the channel state information to the network device based on first duration, wherein:
        when a terminal device determines to activate a first antenna panel and measure the at least one reference signal by using the first antenna panel, the first duration is determined based on a first constraint relationship, wherein the first antenna panel is not activated, wherein the first duration is a time interval between a moment at which the network device sends a physical downlink control channel (PDCCH) and a moment at which the terminal device reports the channel state information, wherein the PDCCH is used to schedule the at least one reference signal, wherein the first constraint relationship satisfies $Z=\min(A+T, X+KB)$, and wherein Z indicates the first duration, min( ) indicates a minimization operation, A is first preset duration, T is duration for activating one antenna panel, X indicates beam reporting timing reported by the terminal device, and KB indicates beam switching timing reported by the terminal device; or
        when the terminal device determines not to activate the first antenna panel, the first duration is determined based on a second constraint relationship, wherein the second constraint relationship satisfies $Z=\min(A, X+KB')$, and wherein $KB'=KB-T$.

2. The method according to claim 1, wherein before receiving the at least one reference signal from the network device, the method further comprises:
    receiving first information from the network device, wherein the first information indicates to activate the first antenna panel.

3. The method according to claim 1, wherein before receiving the at least one reference signal from the network device, the method further comprises:
    sending second information to the network device, wherein the second information indicates whether the terminal device is to activate the first antenna panel and measure the at least one reference signal by using the first antenna panel.

4. The method according to claim 1, wherein the method further comprises:

when duration between a first moment and a second moment is greater than or equal to a difference value obtained by subtracting the beam reporting timing from the first duration, measuring a reference signal by using the first antenna panel, wherein the last reference signal in the at least one reference signal is received at the first moment, and the PDCCH is received at the second moment.

5. The method according to claim 4, wherein the method comprises:

when the duration between the first moment and the second moment is less than the difference value, measuring the reference signal before a third moment by using a beam that is in a default direction and that is generated by a second antenna panel; and measuring the reference signal after the third moment by using the first antenna panel, wherein duration between the third moment and the second moment is equal to the difference value, and the second antenna panel has been activated when the PDCCH is received.

6. The method according to claim 4, wherein the method comprises:

when the duration between the first moment and the second moment is less than the difference value, measuring the reference signal before a fourth moment by using a beam that is in a default direction and that is generated by a second antenna panel; and measuring the reference signal after the fourth moment by using the second antenna panel in a beam scanning manner, wherein duration between the fourth moment and the second moment is equal to an additional difference value obtained by subtracting the duration for activating one antenna panel from the beam reporting timing, and the second antenna panel has been activated when the PDCCH is received.

7. The method according to claim 1, wherein the first duration is greater than the duration for activating one antenna panel.

8. The method according to claim 1, wherein when a subcarrier spacing for transmitting the at least one reference signal is 60 KHz, A is equal to 44, T is any value in a set $\{112, 168, 224, 280, 336\}$, X is any value in a set $\{8, 14, 28\}$, and KB is any value in a set $\{14, 28, 48, 224, 336\}$; or when a subcarrier spacing for transmitting the at least one reference signal is 120 KHz, A is equal to 97, T is any value in a set $\{56, 84, 112, 140, 168, 224, 336\}$, X is any value in a set $\{14, 28, 56\}$, and KB is any value in a set $\{14, 28, 48, 224, 336\}$.

9. A resource indication method, comprising:

determining a first resource based on first duration, wherein the first resource is used by a terminal device to report channel state information; and indicating the first resource to the terminal device, wherein:

when the terminal device determines to activate a first antenna panel and measure a reference signal by using the first antenna panel, the first duration is determined based on a first constraint relationship, wherein the first antenna panel is not activated by the terminal device, wherein the first duration is a time interval between a moment at which a physical downlink control channel (PDCCH) is sent and a moment at which the terminal device reports the channel state information, and the PDCCH is used to schedule the reference signal, wherein the first constraint relationship satisfies $Z=\min(A+T, X+KB)$, wherein Z indicates the first duration, min( ) indicates a minimization operation, A is first preset duration, T is duration for the terminal device to activate one antenna panel, X indicates beam reporting timing reported by the terminal device, and KB indicates beam switching timing reported by the terminal device; or when the terminal device determines not to activate the first antenna panel, the first duration is determined based on a second constraint relationship, wherein the second constraint relationship satisfies $Z=\min(A, X+KB')$, wherein $KB'=KB-T$.

10. The method according to claim 9, wherein before indicating the first resource to the terminal device, the method further comprises:

sending first information to the terminal device, wherein the first information indicates to activate the first antenna panel.

11. The method according to claim 9, wherein before indicating the first resource to the terminal device, the method further comprises:

receiving second information from the terminal device, wherein the second information indicates whether the terminal device is to activate the first antenna panel and measure at least one reference signal by using the first antenna panel.

12. The method according to claim 9, wherein the first duration is greater than the duration for activating one antenna panel.

13. The method according to claim 9, wherein when a subcarrier spacing of the first resource is 60 KHz, A is equal to 44, T is any value in a set $\{112, 168, 224, 280, 336\}$, X is any value in a set $\{8, 14, 28\}$, and KB is any value in a set $\{14, 28, 48, 224, 336\}$; or when a subcarrier spacing of the first resource is 120 KHz, A is equal to 97, T is any value in a set $\{56, 84, 112, 140, 168, 224, 336\}$, X is any value in a set $\{14, 28, 56\}$, and KB is any value in a set $\{14, 28, 48, 224, 336\}$.

14. A communication apparatus, comprising:

at least one processor; and one or more memories coupled to the at least one processor and storing programming instructions for execution by the at least one processor to:

receive at least one reference signal from a network device;

determine channel state information based on some or all of the at least one reference signal; and report the channel state information to the network device based on first duration, wherein:

when a terminal device determines to activate a first antenna panel and measure the at least one reference signal by using the first antenna panel, the first duration is determined based on a first constraint relationship, wherein the first antenna panel is not activated, wherein the first duration is a time interval between a moment at which the network device sends a physical downlink control channel (PDCCH) and a moment at which the terminal device reports the channel state information, and the PDCCH is used to schedule the at least one reference signal, wherein the first constraint relationship satisfies $Z=\min(A+T, X+KB)$, wherein Z indicates the first duration, min( ) indicates a minimization operation, A is first preset duration, T is duration for activating one antenna panel, X indicates beam reporting timing reported by the terminal device, and KB indicates beam switching timing reported by the terminal device; or when the terminal device determines not to activate the first antenna panel, the first duration is determined based on a second constraint relationship, wherein the second constraint relationship satisfies Z=min(A, X+KB'), wherein KB'=KB−T.

15. The apparatus according to claim 14, wherein before receiving the at least one reference signal from the network device, the programming instructions are for execution by the at least one processor to:
receive first information from the network device, wherein the first information indicates to activate the first antenna panel.

16. The apparatus according to claim 14, wherein before receiving the at least one reference signal from the network device, the programming instructions are for execution by the at least one processor to:
send second information to the network device, wherein the second information indicates whether the terminal device is to activate the first antenna panel and measure the at least one reference signal by using the first antenna panel.

17. The apparatus according to claim 14, wherein the programming instructions are for execution by the at least one processor to:
when duration between a first moment and a second moment is greater than or equal to a difference value obtained by subtracting the beam reporting timing from the first duration, measure a reference signal by using the first antenna panel, wherein
the last reference signal in the at least one reference signal is received at the first moment, and the PDCCH is received at the second moment.

18. The apparatus according to claim 17, wherein the programming instructions are for execution by the at least one processor to:
when the duration between the first moment and the second moment is less than the difference value, measure the reference signal before a third moment by using a beam that is in a default direction and that is generated by a second antenna panel; and
measure the reference signal after the third moment by using the first antenna panel, wherein duration between the third moment and the second moment is equal to the difference value, and the second antenna panel has been activated when the PDCCH is received.

19. The apparatus according to claim 17, wherein the programming instructions are for execution by the at least one processor to:
when the duration between the first moment and the second moment is less than the difference value, measure the reference signal before a fourth moment by using a beam that is in a default direction and that is generated by a second antenna panel; and
measure the reference signal after the fourth moment by using the second antenna panel in a beam scanning manner, wherein duration between the fourth moment and the second moment is equal to an additional difference value obtained by subtracting the duration for activating one antenna panel from the beam reporting timing, and the second antenna panel has been activated when the PDCCH is received.

20. The apparatus according to claim 14, wherein the first duration is greater than the duration for activating one antenna panel.

* * * * *